United States Patent
Cui et al.

(10) Patent No.: US 9,025,953 B2
(45) Date of Patent: May 5, 2015

(54) METHOD AND DEVICE FOR DETECTING SIGNAL POWER

(71) Applicant: Huawei Technologies Co., Ltd., Shenzhen (CN)

(72) Inventors: Zhenwei Cui, Wuhan (CN); Zongwang Wang, Wuhan (CN); Min Lian, Wuhan (CN); Jing Wang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 170 days.

(21) Appl. No.: 13/760,659

(22) Filed: Feb. 6, 2013

(65) Prior Publication Data

US 2014/0050474 A1 Feb. 20, 2014

(30) Foreign Application Priority Data

Feb. 17, 2012 (CN) .......................... 2012 1 0036731

(51) Int. Cl.
*H04B 10/08* (2006.01)
*H04B 10/079* (2013.01)

(52) U.S. Cl.
CPC ...... *H04B 10/07955* (2013.01); *H04B 10/0795* (2013.01)

(58) Field of Classification Search
CPC .......... H04B 10/0775; H04B 10/0795; H04B 10/07955
USPC ..................................................... 398/37, 38
See application file for complete search history.

(56) References Cited

U.S. PATENT DOCUMENTS

| 7,414,234 B1 | 8/2008 | Teeter et al. | |
|---|---|---|---|
| 2010/0210952 A1* | 8/2010 | Taira et al. | 600/476 |
| 2011/0129232 A1 | 6/2011 | Dou et al. | |
| 2012/0191997 A1* | 7/2012 | Miller | 713/323 |
| 2013/0090564 A1* | 4/2013 | Tateishi et al. | 600/479 |

FOREIGN PATENT DOCUMENTS

| CN | 101170360 A | 4/2008 |
|---|---|---|
| CN | 101634590 A | 1/2010 |
| CN | 101814948 A | 8/2010 |
| CN | 102082603 A | 6/2011 |
| JP | 2006333019 A | 12/2006 |
| KR | 20020043684 A | 6/2002 |

* cited by examiner

*Primary Examiner* — Dzung Tran
(74) *Attorney, Agent, or Firm* — Brinks Gilson & Lione

(57) ABSTRACT

The present invention discloses a method and a device for detecting a signal power, and belongs to the field of communications. The method includes: when a receiver converts a received receive signal and outputs an output signal, separating a direct current signal and an alternating current signal from the output signal; converting the direct current signal into a first analog voltage signal; converting the alternating current signal into a second analog voltage signal through a transimpedance amplifier TIA; and obtaining a power of the receive signal according to the first analog voltage signal and the second analog voltage signal. The device includes: a first separating module, a first converting module, and an obtaining module. The present invention can improve accuracy of detecting a signal power.

15 Claims, 8 Drawing Sheets

METHOD AND DEVICE FOR DETECTING SIGNAL POWER

CROSS-REFERENCE TO RELATED APPLICATION

This application claims priority to Chinese Patent Application No. 201210036731.2, filed on Feb. 17, 2012, which is hereby incorporated by reference in its entirety.

FIELD OF THE INVENTION

The present invention relates to the field of communications, and in particular to a method and a device for detecting a signal power.

BACKGROUND OF THE INVENTION

In an optical network communications system, photoelectric conversion components have certain requirements for the strength range of input light. If the strength of input light exceeds a specific range, the network will be abnormal. Network maintenance personnel may detect powers of optical signals, determine strength of input light according to the power of optical signals, and take corresponding measures for intervention.

At present, two methods for detecting a power of an optical signal are available, including:

Method 1: When a receiver converts a received optical signal and outputs an output signal, separate a direct current signal from the output signal, convert the direct current signal into an analog voltage signal, convert the analog voltage signal into a digital signal, and calculate a power of the optical signal according to the digital signal.

Method 2: When a receiver converts a received optical signal and outputs an output signal, separate an alternating current signal from the output signal, convert the direct current signal into a radio frequency direct current voltage signal through a TIA (Transimpedance Amplifier, transimpedance amplifier), convert the radio frequency direct current voltage signal into an analog voltage signal, convert the analog voltage signal into a digital signal, and calculate a power of the optical signal according to the digital signal.

It should be noted that: after the receiver receives the optical signal, it converts the optical signal into a photogenerated current signal. The photogenerated current signal includes a direct current photogenerated current signal and an alternating current photogenerated current signal. In addition, the receiver itself will produce a penetrating current signal with weak signal strength, and the penetrating current signal is a direct current signal. Therefore, the separated direct current signal includes the direct current photogenerated current signal and penetrating current signal, and the separated alternating current signal includes the alternating current photogenerated current signal.

During the implementation of the present invention, the inventor discovers that the prior art has at least the following problems:

In the method 1, when the optical signal is weak, the percent of the penetrating current signal included in the separated direct current signal is large, so that the error of the calculated power of the optical signal is large.

In the method 2, the TIA has a saturation point. When the optical signal is strong, the strength of the separated alternating current signal exceeds the saturation point of the TIA. The strength of the radio frequency direct current voltage signal output by the TIA remains unchanged when the saturation point of the TIA is reached. As such, when the optical signal is strong, the error of the calculated power of the optical signal is large.

SUMMARY OF THE INVENTION

To improve accuracy of detecting a signal power, the present invention provides a method and a device for detecting a signal power. The technical solutions are as follows:

A method for detecting a signal power includes:

when a receiver converts a received receive signal and outputs an output signal, separating a direct current signal and an alternating current signal from the output signal;

converting the direct current signal into a first analog voltage signal; and converting the alternating current signal into a second analog voltage signal through a transimpedance amplifier TIA; and obtaining a power of the receive signal according to the first analog voltage signal and the second analog voltage signal, where, the obtaining a power of the receive signal according to the first analog voltage signal and the second analog voltage signal includes:

calculating a first power of the receive signal according to the first analog voltage signal, and determining whether the first power of the receive signal is in a first power range; if yes, using the first power as a detection result; if no, calculating a second power of the receive signal according to the second analog voltage signal and using the second power as the detection result, where an error percent of a signal power included in the first power range is lower than a preset percent; or, calculating a second power of the receive signal according to the second analog voltage signal, and determining whether the second power of the receive signal is in a second power range; if yes, using the second power as a detection result; if no, calculating a first power of the receive signal according to the first analog voltage signal and using the first power as the detection result, where an error percent of a signal power included in the second power range is lower than a preset percent.

A device for detecting a signal power includes:

a first separating module, configured to: when a receiver converts a received receive signal and outputs an output signal, separate a direct current signal and an alternating current signal from the output signal;

a first converting module, configured to convert the direct current signal into a first analog voltage signal; and convert the alternating current signal into a second analog voltage signal through a transimpedance amplifier TIA; and an obtaining module, configured to obtain a power of the receive signal according to the first analog voltage signal and the second analog voltage signal, where, the obtaining module includes:

a first calculating unit, configured to calculate a first power of the receive signal according to the first analog voltage signal, and determine whether the first power of the receive signal is in a first power range; if yes, use the first power as a detection result; if no, calculate a second power of the receive signal according to the second analog voltage signal and use the second power as the detection result, where an error percent of a signal power included in the first power range is lower than a preset percent; or, a second calculating unit, configured to calculate a second power of the receive signal according to the second analog voltage signal, and determine whether the second power of the receive signal is in a second power range; if yes, use the second power as a detection result; if no, calculate a first power of the receive signal according to the first analog voltage signal and use the first power as the detection result, where an error percent of a signal power included in the second power range is lower than a preset percent.

According to the present invention, a direct current signal and an alternating current signal are separated from the output signal of a receiver, the direct current signal is converted into a first analog voltage signal, and the alternating current signal is converted through a TIA into a second analog voltage signal. A first power of the receive signal is calculated according to the first analog voltage signal, and a determination is made about whether the first power is in a first power range. If yes, the accuracy of the first power is high, and the first power is used as a detection result. If no, the signal is weak, and the percent of the error in the second analog voltage signal is low. A second power of the receive signal is calculated according to the second analog voltage signal, the accuracy of the second power is high, and the second power is used as the detection result. Or, a second power of the receive signal is calculated according to the second analog voltage signal, and a determination is made about whether the second power is in a second power range. If yes, the accuracy of the second power is high, and the second power is used as the detection result. If no, the signal is weak, and the percent of the error in the first analog voltage signal is low. A first power of the receive signal is calculated according to the first analog voltage signal, the accuracy of the first power is high, and the first power is used as the detection result. As such, the accuracy of detecting a signal power is improved.

DETAILED DESCRIPTION OF THE EMBODIMENTS

To make the objectives, technical solutions, and advantages of the present invention more comprehensible, the following further describes in detail the embodiments of the present invention with reference to the accompanying drawings.

Embodiment 1

Figure 1:
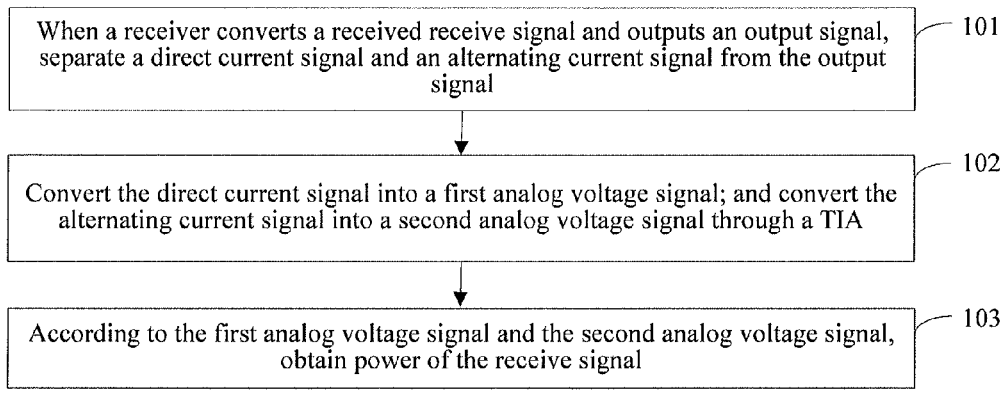
FIG. 1 is a flow chart of a method for detecting a signal power according to Embodiment 1 of the present invention.

As shown in FIG. 1, Embodiment 1 provides a method for detecting a signal power, including:

Step 101: When a receiver converts a received receive signal and outputs an output signal, separate a direct current signal and an alternating current signal from the output signal.

The receive signal received by the receiver includes an optical signal, a radio signal, or a microwave signal.

Step 102: Convert the direct current signal into a first analog voltage signal; and convert the alternating current signal into a second analog voltage signal through a TIA.

Step 103: Obtain a power of the receive signal according to the first analog voltage signal and the second analog voltage signal.

Specifically, a first power of the receive signal is calculated according to the first analog voltage signal, and a determination is made about whether the first power is in a first power range. If yes, the first power is used as a detection result. If no, a second power of the receive signal is calculated according to the second analog voltage signal, and the second power is used as the detection result; or, a second power of the receive signal is calculated according to the second analog voltage signal, and a determination is made about whether the second power is in a second power range. If yes, the second power is used as a detection result. If no, a first power of the receive signal is calculated according to the first analog voltage signal, and the first power is used as the detection result.

A percent of the error of the signal power included in the first power range is lower than a preset percent, and a percent of the error of the signal power included in the second power range is lower than the preset percent.

According to this embodiment, a direct current signal and an alternating current signal are separated from the output signal of a receiver, the direct current signal is converted into a first analog voltage signal, and the alternating current signal is converted through a TIA into a second analog voltage signal. A first power of the receive signal is calculated according to the first analog voltage signal, and a determination is made about whether the first power of the receive signal is in a first power range. If yes, the accuracy of the first power is high, and the first power is used as a detection result. If no, the signal is weak, and the percent of the error in the second analog voltage signal is low. A second power of the receive signal is calculated according to the second analog voltage signal, the accuracy of the second power is high, and the second power is used as the detection result. Or, a second power of the receive signal is calculated according to the second analog voltage signal, and a determination is made about whether the second power is in a second power range. If yes, the accuracy of the second power is high, and the second power is used as the detection result. If no, the signal is stronger, and the percent of the error in the first analog voltage signal is low. A first power of the receive signal is calculated according to the first analog voltage signal, the accuracy of the first power is high, and the first power is used as the detection result, thereby improving the accuracy of detecting a signal power.

Embodiment 2

Figure 2:
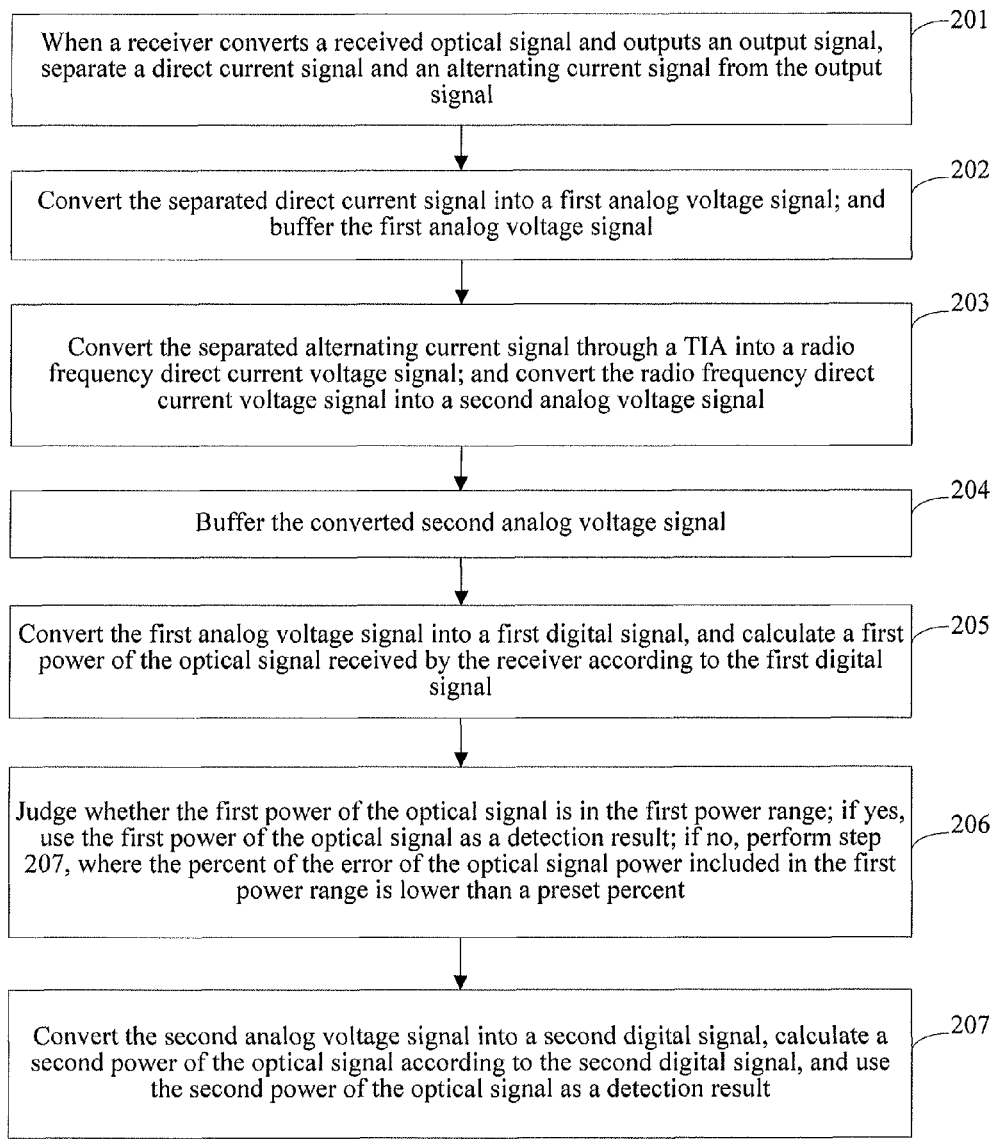
FIG. 2 is a flow chart of a method for detecting a signal power according to Embodiment 2 of the present invention.

This embodiment provides a method for detecting a signal power. The method specifically describes the method provided in Embodiment 1. The receiver receives an optical signal and outputs an output signal, and then uses the method provided in this embodiment to detect a power of the optical signal. As shown in FIG. 2, the method includes:

Step 201: When a receiver converts a received optical signal and outputs an output signal, separate a direct current signal and an alternating current signal from the output signal.

The receiver receives an optical signal, and converts the received optical signal into a photogenerated current signal. The photogenerated current signal includes a direct current photogenerated current signal and an alternating current photogenerated current signal.

The receiver outputs an output signal after converting the received optical signal into the photogenerated current signal. In addition, as the receiver itself has a penetrating current, and the penetrating current is a direct current. As such, the receiver produces a penetrating current signal, and the penetrating current signal is weak and is a direct current signal. Therefore, the output signal output by the receiver further includes the penetrating current signal in addition to the direct current photogenerated current signal and alternating current photogenerated current signal.

Therefore, the direct current signal separated from the output signal output by the receiver includes the direct current penetrating current signal and direct current photogenerated current signal, and the alternating current signal separated from the output signal output by the receiver includes the alternating current photogenerated current signal.

Step 202: Convert the separated direct current signal into a first analog voltage signal; and buffer the first analog voltage signal.

The separated direct current signal includes a penetrating current signal with weak signal strength, so that the converted first analog voltage signal has an error. If the optical signal received by the receiver is strong, the percent of the penetrating current signal in the separated direct current signal is low, but the percent of the direct current photogenerated current signal in the separated direct current signal is large and far larger than the percent of the penetrating current signal. If the optical signal received by the receiver is weak, the percent of the penetrating current signal in the separated direct current signal is large, so that the percent of the error in the first analog voltage signal is large.

Step 203: Convert the separated alternating current signal through a TIA into a radio frequency direct current voltage signal; and convert the radio frequency direct current voltage signal into a second analog voltage signal.

The radio frequency direct current voltage signal may be converted into the second analog voltage signal through a radio frequency amplifier.

The TIA has a saturation point. When the optical signal received by the receiver is weak, the strength of the separated alternating current signal is lower than the saturation point of the TIA. Therefore, no error exists in the obtained radio frequency direct current voltage signal and second analog voltage signal. If the optical signal received by the receiver is strong, the strength of the separated alternating current signal is higher than the saturation point of the TIA. The strength of the radio frequency direct current voltage signal output by the TIA remains unchanged when the strength of the separated alternating current signal is higher than the saturation point of the TIA. Therefore, an error exists in the obtained radio frequency direct current voltage signal and second analog voltage signal.

Step 204: Buffer the converted second analog voltage signal.

In this embodiment, step 202 may be executed simultaneously with steps 203 and 204. Or steps 203 and 204 may be executed before step 202. This embodiment does not specifically restrict the specific execution sequence.

Step 205: Convert the first analog voltage signal into a first digital signal, and calculate a first power of the optical signal received by the receiver according to the first digital signal.

If the optical signal received by the receiver is strong, the percent of the error included in the first analog voltage signal is small. As such, the percent of the error that exists in the power of the optical signal calculated according to a first digital signal after the first analog voltage is converted into the first digital signal is small, and the accuracy of the calculated first power of the optical signal is high. If the optical signal received by the receiver is weak, the percent of the error included in the first analog voltage signal is large. As such, the percent of the error that exists in the first power of the optical signal calculated according to the first digital signal after the first analog voltage signal is converted into the first digital signal is large, and the accuracy of the calculated first power of the optical signal is low.

Step 206: Determine whether the first power of the optical signal is in the first power range. If yes, use the first power of the optical signal as a detection result; if no, perform step 207. The percent of the error of the optical signal power included in the first power range is lower than a preset percent.

The percent of the error of the optical signal power included in the first power range is lower than the preset percent, so that the error that exists in the optical signal power in the first power range may be accepted. In addition, in this embodiment, the first power range may be acquired in advance according to the following steps in (1) to (4), which are specifically as follows:

Persons skilled in the art set in advance a preset number of sampling signals, and each sampling signal is an optical signal whose power is known.

(1): For any one sampling signal, transmit the sampling signal and make the receiver receive the sampling signal to obtain a receive signal corresponding to the sampling signal, so that the receiver outputs an output signal corresponding to the sampling signal according to the receive signal corresponding to the sampling signal.

The receiver converts the receive signal corresponding to the sampling signal and outputs the output signal corresponding to the sampling signal.

(2): Separate a direct current signal from the output signal corresponding to the sampling signal, convert the direct current signal into a digital signal, and calculate a power of the receive signal corresponding to the sampling signal according to the digital signal.

Acquire power of a receive signal corresponding to every other sampling signal according to steps in (1) and (2).

(3): Calculate an error percent corresponding to each sampling signal according to the power of each sampling signal and the power of the receive signal corresponding to each sampling signal and through the following formula (1);

$$\text{Percent} = \left| \frac{P2 - P1}{P1} \right|; \qquad (1)$$

where, in the formula (1), Percent indicates the error percent corresponding to the sampling signal, P1 indicates the power of the sampling signal, and P2 indicates the power of the receive signal corresponding to the sampling signal.

(4): Select a sampling signal whose receive signal has the smallest power from sampling signals whose error percent is less than or equal to a preset percent, and determine that the first power range is larger than or equal to a power of a receive signal corresponding to the selected sampling signal.

It should be noted that: the stronger the sampling signal is, the smaller the percent of the error corresponding to the sampling signal is. The percent of the error of the sampling signal whose receive signal has the smallest power among the sampling signals whose error percents are smaller than or equal to a preset percent is the largest. Therefore, it is determined that the first power range is larger than or equal to the power of the receive signal corresponding to the selected sampling signal, so that the percents of the errors of the optical signal powers in the first power range are all lower than the preset percent.

For example, as described in Table 1, ten sampling signals are set in advance. Each sampling signal is an optical signal whose power is known. Obtain a percent of an error corresponding to each sampling signal according to steps in (1) to (3). Select the sampling signal 5 whose receive signal has the smallest power from the sampling signals 5, 6, 7, 8, 9, and 10 whose error percents are smaller than or equal to the preset percent 0.021. Determine that the first power range is larger than or equal to the power 51 of the receive signal corresponding to the selected sampling signal 5.

TABLE 1

| Sampling Signal | Sampling Signal Power | Receive Signal Power | Error Percent |
| --- | --- | --- | --- |
| Sampling signal 1 | 10 | 11 | 0.1 |
| Sampling signal 2 | 20 | 21 | 0.05 |
| Sampling signal 3 | 30 | 31 | 0.033 |
| Sampling signal 4 | 40 | 41 | 0.025 |
| Sampling signal 5 | 50 | 51 | 0.02 |
| Sampling signal 6 | 60 | 61 | 0.17 |
| Sampling signal 7 | 70 | 71 | 0.0143 |
| Sampling signal 8 | 80 | 81 | 0.0125 |
| Sampling signal 9 | 90 | 91 | 0.0111 |
| Sampling signal 10 | 100 | 101 | 0.01 |

Step 207: Convert the second analog voltage signal into a second digital signal, calculate a second power of the optical signal according to the second digital signal, and use the second power of the optical signal as a detection result.

The optical signal received by the receiver is weak, so that the separated alternating current signal is weak and is lower than the saturation point of the TIA. As such, no error exists in the second analog voltage signal. Therefore, no error exists in the second digital signal obtained through conversion either. The accuracy of the second power of the optical signal calculated according to the second digital signal is high.

The method according to this embodiment is used in a photoelectric conversion apparatus.

According to this embodiment, a direct current signal and an alternating current signal are separated from the output signal of the receiver. The direct current signal is converted into a first analog voltage signal. The alternating current signal is converted through a TIA into a radio frequency direct current voltage signal. The radio frequency direct current voltage signal is converted into a second analog voltage signal, and the second analog voltage signal is buffered. A first power of the optical signal is calculated according to the first analog voltage signal, and a determination is made about whether the first power of the optical signal is in a first power range. If yes, the accuracy of the first power of the optical signal is high, and the first power of the optical signal is used as a detection result. If no, it is determined that the optical signal is weak, and the separated alternating current signal is lower than a saturation point of the TIA. A second power of the optical signal is calculated according to the second analog voltage signal, the accuracy of the second power of the optical signal is high, and the second power of the optical signal is used as the detection result. As such, the accuracy of detecting a power of the optical signal is improved.

Embodiment 3

Figure 3:
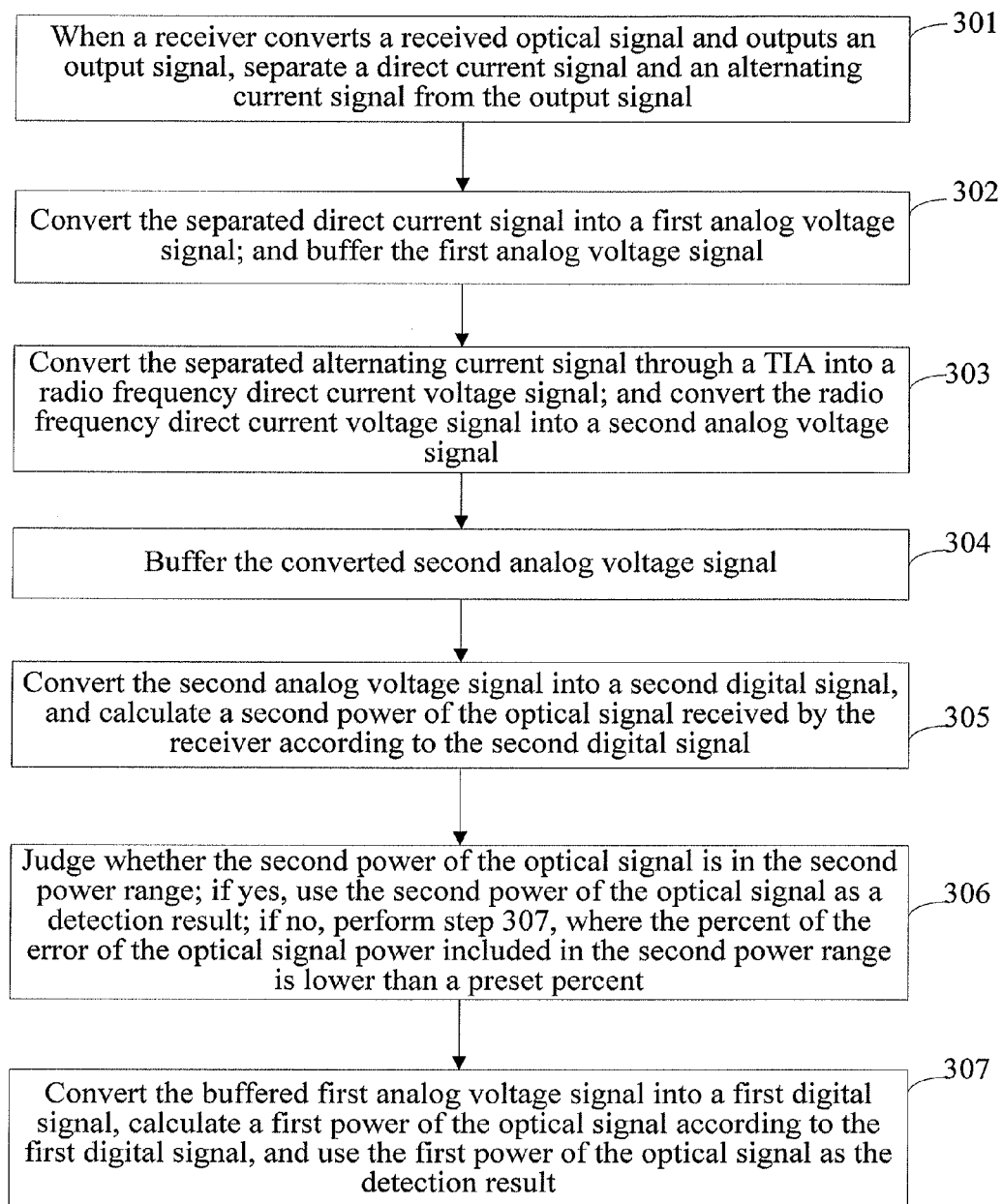
FIG. 3 is a flow chart of a method for detecting a signal power according to Embodiment 3 of the present invention.

This embodiment provides a method for detecting a signal power. The method specifically describes the method provided in Embodiment 1. The receiver receives an optical signal and outputs an output signal, and then uses the method provided in this embodiment to detect a power of the optical signal. As shown in FIG. 3, the method includes:

Steps 301-304: They are the same as steps 201-204 in Embodiment 2 respectively, and are no longer described herein.

Step 305: Convert the second analog voltage signal into a second digital signal, and calculate a second power of the optical signal received by the receiver according to the second digital signal.

If the optical signal received by the receiver is so strong that the separated alternating current signal is strong and is larger than the saturation point of the TIA, therefore, the obtained second analog voltage signal has a large error. An error exists in the second power of the optical signal calculated according to a second digital signal after the second analog voltage signal is converted into the second digital signal. The accuracy of the calculated second power of the optical signal is low. If the optical signal received by the receiver is so weak that the separated alternating current signal is weak and is smaller than or equal to the saturation point of the TIA, therefore, the obtained second analog voltage signal has no error. No error exists in the second power of the optical signal calculated according to a second digital signal after the second analog voltage signal is converted into the second digital signal. The accuracy of the calculated second power of the optical signal is high.

Step 306: Determine whether the second power of the optical signal is in the second power range. If yes, use the second power of the optical signal as a detection result; if no, perform step 307. The percent of the error of the optical signal power included in the second power range is lower than a preset percent.

The percent of the error of the optical signal power included in the second power range is lower than the preset percent, so that the error that exists in the optical signal power in the second power range may be accepted. In addition, in this embodiment, the second power range may be acquired in advance according to the following steps in (1) to (4), which are specifically as follows:

Persons skilled in the art set in advance a preset number of sampling signals, and each sampling signal is an optical signal whose power is known.

(1): For any one sampling signal, transmit the sampling signal and make the receiver receive the sampling signal to obtain a receive signal corresponding to the sampling signal, so that the receiver outputs an output signal corresponding to the sampling signal according to the receive signal corresponding to the sampling signal.

The receiver converts the receive signal corresponding to the sampling signal and outputs the output signal corresponding to the sampling signal.

(2): Separate an alternating current signal from the output signal corresponding to the sampling signals, converting the alternating current signal into a radio frequency direct current voltage signal through the TIA, convert the radio frequency direct current voltage signal into a digital signal, and calculating a power of the receive signal corresponding to the sampling signals according to the digital signal.

Acquire a power of a receive signal corresponding to every other sampling signal according to steps in (1) and (2).

(3): Calculate an error percent corresponding to each sampling signal according to the power of each sampling signal and the power of the receive signal corresponding to each sampling signal and through the following formula (2);

$$\text{Percent} = \left| \frac{P1 - P3}{P1} \right|; \qquad (2)$$

where, in the formula (2), Percent indicates the error percent corresponding to the sampling signal, P1 indicates the power of the sampling signal, and P3 indicates the power of the receive signal corresponding to the sampling signal.

(4): Select a sampling signal whose receive signal has the largest power from sampling signals whose error percent is less than or equal to a preset percent, and determine that the second power range is less than a power of a receive signal corresponding to the selected sampling signal.

It should be noted that: the weaker the sampling signal is, the smaller the percent of the error corresponding to the sampling signal is. The percent of the error of the sampling signal whose receive signal has the largest power among the sampling signals whose error percents are smaller than or equal to a preset percent is the largest. Therefore, it is determined that the second power range is smaller than or equal to the power of the receive signal corresponding to the selected sampling signal, so that the percents of the errors of the optical signal powers in the second power range are all lower than the preset percent.

For example, as described in Table 2, ten sampling signals are set in advance. Each sampling signal is an optical signal whose power is known. Obtain a percent of an error corresponding to each sampling signal according to steps in (1) to (3). Select the sampling signal 6 whose receive signal has the largest power from the sampling signals 1, 2, 3, 4, 5, and 6 whose error percents are lower than the preset percent 0.021. Determine that the second power range is larger than or equal to the power 55 of the receive signal corresponding to the selected sampling signal 6.

TABLE 2

| Sampling Signal | Sampling Signal Power | Receive Signal Power | Error Percent |
|---|---|---|---|
| Sampling signal 1 | 10 | 10 | 0 |
| Sampling signal 2 | 20 | 20 | 0 |
| Sampling signal 3 | 30 | 30 | 0 |
| Sampling signal 4 | 40 | 40 | 0 |
| Sampling signal 5 | 50 | 50 | 0 |
| Sampling signal 6 | 60 | 55 | 0.083 |
| Sampling signal 7 | 70 | 55 | 0.214 |
| Sampling signal 8 | 80 | 55 | 0.3125 |
| Sampling signal 9 | 90 | 55 | 0.3889 |
| Sampling signal 10 | 100 | 55 | 0.45 |

Step 307: Convert the buffered first analog voltage signal into a first digital signal, calculate a first power of the optical signal received by the receiver according to the first digital signal, and use the first power of the optical signal as the detection result.

As the optical signal received by the receiver is so strong that the direct current photogenerated current signal included in the separated direct current signal is strong, the percent of the direct current photogenerated current signal in the direct current signal is large, and the percent of the penetrating current signal is small, the percents of the errors in the first analog voltage signal and first digital signal are small so that the accuracy of the calculated first power of the optical signal is high.

The method according to this embodiment is used in a photoelectric conversion apparatus.

According to this embodiment, a direct current signal and an alternating current signal are separated from the output signal of the receiver. The direct current signal is converted into a first analog voltage signal, and the first analog voltage signal is buffered. The alternating current signal is converted through a TIA into a radio frequency direct current voltage signal. The radio frequency direct current voltage signal is converted into a second analog voltage signal. A second power of the optical signal is calculated according to the second analog voltage signal, and a determination is made about whether the second power of the optical signal is in a second power range. If yes, the accuracy of the second power of the optical signal is high, and the second power of the optical signal is used as a detection result. If no, it is determined that the optical signal is strong, and a percent of the error in the first analog voltage signal is small. A first power of the optical signal is calculated according to the first analog voltage signal, the accuracy of the calculated first power of the optical signal is high, and the first power of the optical signal is used as the detection result. As such, the accuracy of detecting a power of the optical signal is improved.

Embodiment 4

Figure 4:
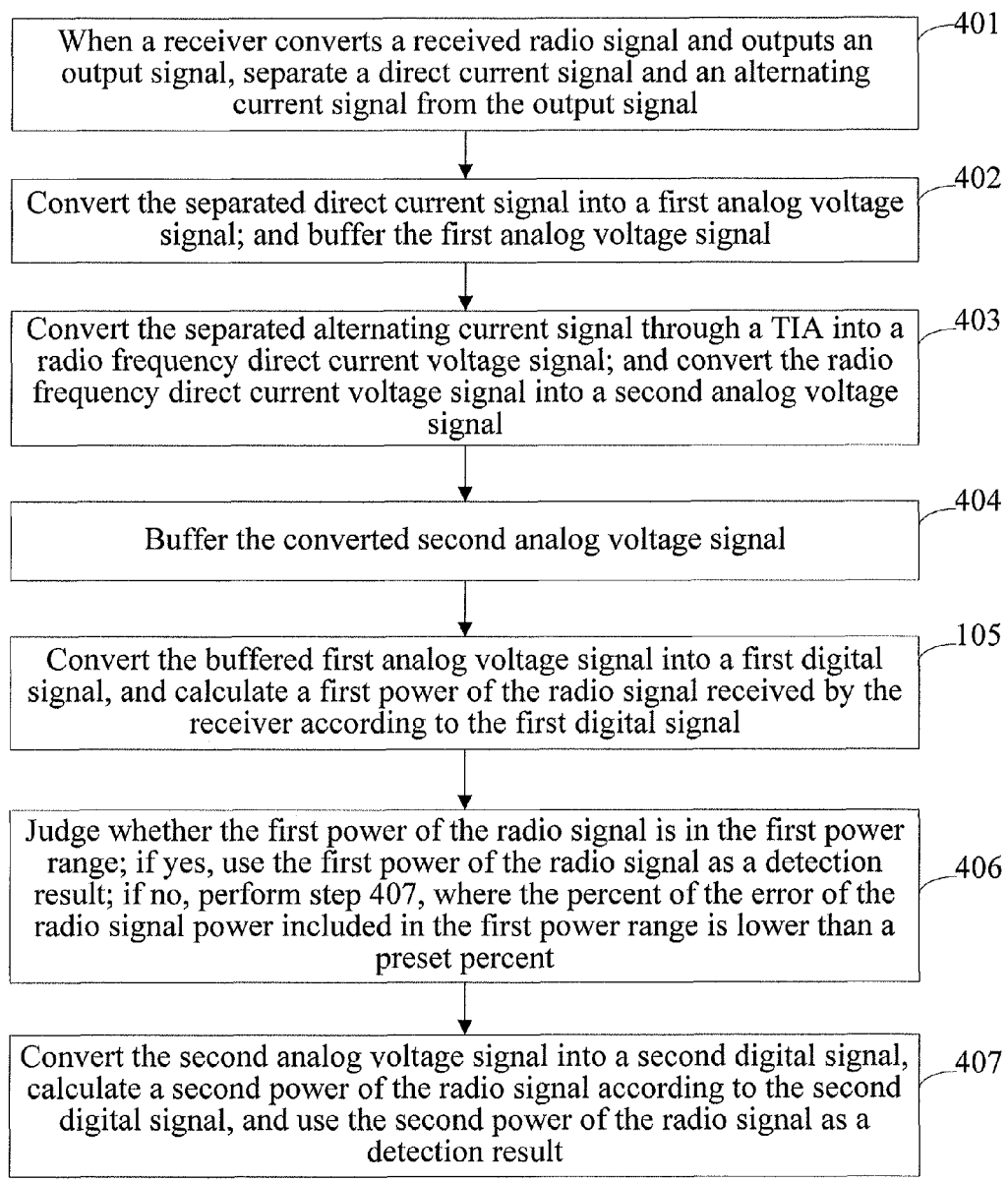
FIG. 4 is a flow chart of a method for detecting a signal power according to Embodiment 4 of the present invention.

This embodiment provides a method for detecting a signal power. The method specifically describes the method provided in Embodiment 1. The receiver receives a radio signal and outputs an output signal, and then uses the method provided in this embodiment to detect a power of the radio signal. As shown in FIG. 4, the method includes:

Step 401: When a receiver converts a received radio signal and outputs an output signal, separate a direct current signal and an alternating current signal from the output signal.

The receiver receives a radio signal, and converts the received radio signal into a first current signal. The first current signal includes a direct current first current signal and an alternating current first current signal.

The receiver outputs an output signal after converting the received radio signal into the first current signal. In addition, as the receiver itself has a penetrating current, and the penetrating current is a direct current. As such, the receiver produces a penetrating current signal, and the penetrating current signal is weak and is a direct current signal. Therefore, the output signal output by the receiver further includes the penetrating current signal in addition to the direct current first current signal and alternating current first current signal.

Therefore, the direct current signal separated from the output signal output by the receiver includes the direct current penetrating current signal and direct current first current signal, and the alternating current signal separated from the output signal output by the receiver includes the alternating current first current signal.

Step 402: Convert the separated direct current signal into a first analog voltage signal; and buffer the first analog voltage signal.

The separated direct current signal includes a penetrating current signal with weak signal strength, so that the converted first analog voltage signal has an error. If the radio signal received by the receiver is strong, the percent of the penetrating current signal in the separated direct current signal is low, but the percent of the direct current first current signal in the separated direct current signal is large and far larger than the percent of the penetrating current signal. If the radio signal received by the receiver is weak, the percent of the penetrating current signal in the separated direct current signal is large, so that the percent of the error in the first analog voltage signal is large.

Step 403: Convert the separated alternating current signal through a TIA into a radio frequency direct current voltage signal; and convert the radio frequency direct current voltage signal into a second analog voltage signal.

The TIA has a saturation point. When the radio signal received by the receiver is weak, the strength of the separated alternating current signal is lower than the saturation point of the TIA. Therefore, no error exists in the obtained radio frequency direct current voltage signal and second analog voltage signal. If the radio signal received by the receiver is strong, the strength of the separated alternating current signal is higher than the saturation point of the TIA. The strength of the radio frequency direct current voltage signal output by the TIA remains unchanged when the strength of the separated alternating current signal is higher than the saturation point of the TIA. Therefore, an error exists in the obtained radio frequency direct current voltage signal and second analog voltage signal.

Step 404: Buffer the converted second analog voltage signal.

In this embodiment, step 402 may be executed simultaneously with steps 403 and 404. Or steps 403 and 404 may be executed before step 402. This embodiment does not specifically restrict the specific execution sequence.

Step 405: Convert the buffered first analog voltage signal into a first digital signal, and calculate a first power of the radio signal received by the receiver according to the first digital signal.

If the radio signal received by the receiver is strong, the percent of the error included in the first analog voltage signal is small. As such, the percent of the error that exists in a first power of the radio signal calculated according to a first digital signal after the first analog voltage signal is converted into the first digital signal is small, and the accuracy of the first power of the radio signal is high. If the radio signal received by the receiver is weak, the percent of the error included in the first analog voltage signal is large. As such, the percent of the error that exists in the first power of the radio signal calculated according to the first digital signal after the first analog voltage signal is converted into the first digital signal is large, and the accuracy of the acquired first power of the radio signal is low.

Step 406: Determine whether the first power of the radio signal is in the first power range. If yes, use the first power of the radio signal as a detection result; if no, perform step 407. The percent of the error of the radio signal power included in the first power range is lower than a preset percent.

The percent of the error of the radio signal power included in the first power range is lower than the preset percent, so that the error that exists in the radio signal power in the first power range may be accepted. Persons skilled in the art set in advance a preset number of sampling signals, where each sampling signal is a radio signal whose power is known, and then acquire the first power range according to the preset number of sampling signals. For how to acquire the first power range, reference may be made to steps in (1) to (4) in step 206 of Embodiment 2, and it is no longer described herein.

Step 407: Convert the second analog voltage signal into a second digital signal, calculate a second power of the radio signal according to the second digital signal, and use the second power of the radio signal as a detection result.

The radio signal received by the receiver is weak, so that the separated alternating current signal is weak and is lower than the saturation point of the TIA. As such, no error exists in the second analog voltage signal. Therefore, no error exists in the second digital signal obtained through conversion either. The accuracy of the second power of the radio signal calculated according to the second digital signal is high.

According to this embodiment, a direct current signal and an alternating current signal are separated from the output signal of the receiver. The direct current signal is converted into an analog voltage signal. The alternating current signal is converted through a TIA into a radio frequency direct current voltage signal. The radio frequency direct current voltage signal is converted into a second analog voltage signal. The second analog voltage signal is buffered. According to the first power of the radio signal calculated according to the first analog voltage signal, a determination is made about whether the first power of the radio signal is in a first power range. If yes, the first power of the radio signal is used as a detection result. If no, it is determined that the radio signal is weak, and the alternating current signal is lower than a saturation point of the TIA. A second power of the radio signal is calculated according to the second analog voltage signal, the accuracy of the second power of the radio signal is high, and the second power of the radio signal is used as the detection result. As such, the accuracy of detecting a radio signal power is improved.

Embodiment 5

Figure 5:
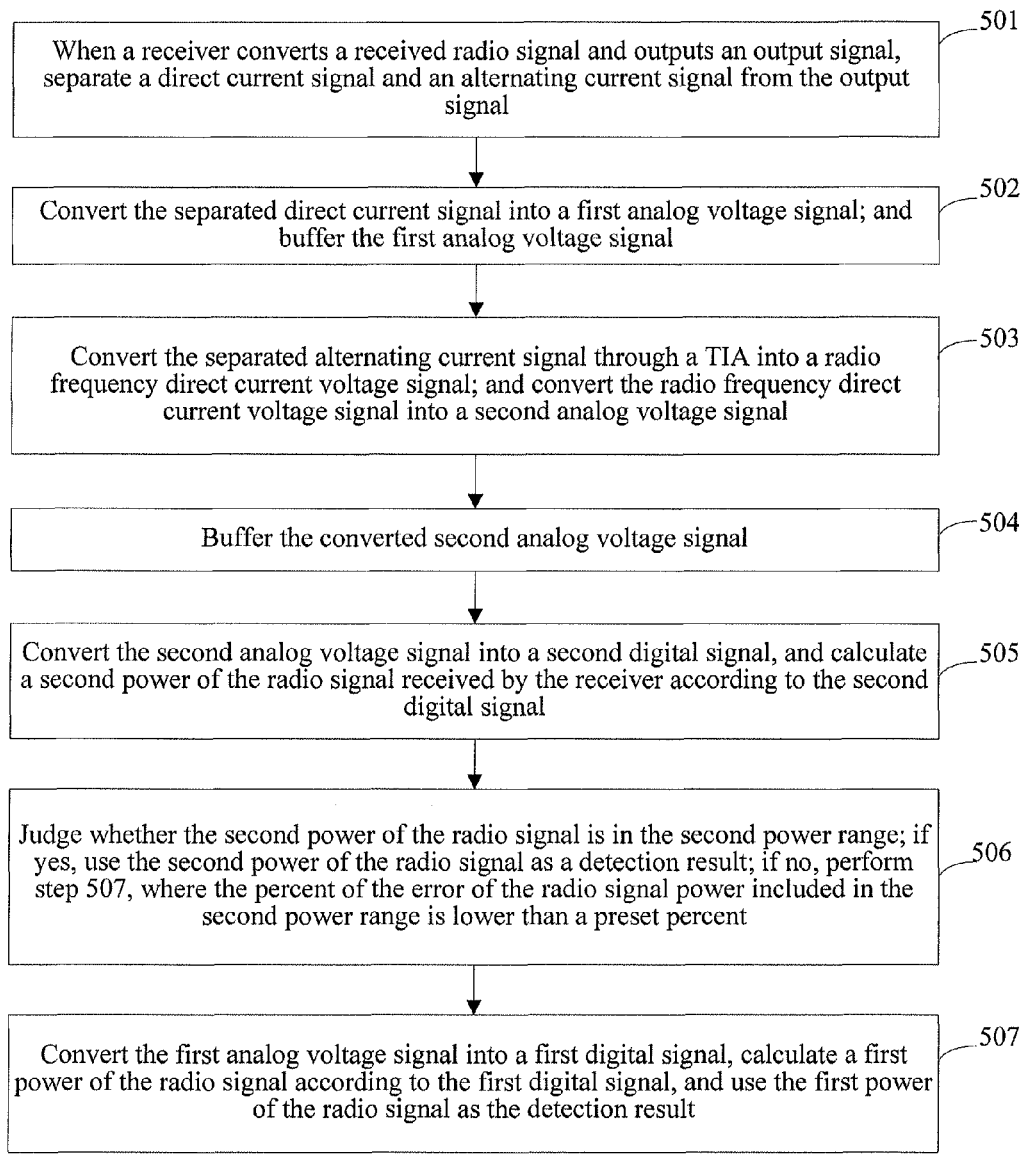
FIG. 5 is a flow chart of a method for detecting a signal power according to Embodiment 5 of the present invention.

This embodiment provides a method for detecting a signal power. The method specifically describes the method provided in Embodiment 1. The receiver receives a radio signal and outputs an output signal, and then uses the method provided in this embodiment to detect a power of the radio signal. As shown in FIG. 5, the method includes:

Steps 501-504: They are the same as steps 401-404 in Embodiment 4 respectively, and are no longer described herein.

Step 505: Convert the second analog voltage signal into a second digital signal, and calculate a second power of the radio signal received by the receiver according to the second digital signal.

If the radio signal received by the receiver is so strong that the separated alternating current signal is strong and is larger than the saturation point of the TIA, therefore, the obtained second analog voltage signal has a large error. An error exists in the second power of the radio signal calculated according to a second digital signal after the second analog voltage signal is converted into the second digital signal. The accuracy of the second power of the radio signal is low. If the radio signal received by the receiver is so weak that the separated alternating current signal is weak and is smaller than or equal to the saturation point of the TIA, therefore, the obtained second analog voltage signal has no error. No error exists in the second power of the radio signal calculated according to a second digital signal after the second analog voltage signal is converted into the second digital signal. The accuracy of the second power of the radio signal is high.

Step 506: Determine whether the second power of the radio signal is in the second power range. If yes, use the second power of the radio signal as a detection result; if no, perform step 507. The percent of the error of the radio signal power included in the second power range is lower than a preset percent.

The percent of the error of the radio signal power included in the second power range is lower than the preset percent, so that the error that exists in the radio signal power in the second power range may be accepted. Persons skilled in the art set in advance a preset number of sampling signals, where each sampling signal is a radio signal whose power is known, and then acquire the second power range according to the preset number of sampling signals. For how to acquire the second power range, reference may be made to steps in (1) to (4) in step 306 of Embodiment 3, and it is no longer described herein.

Step 507: Convert the first analog voltage signal into a first digital signal, calculate a first power of the radio signal received by the receiver according to the first digital signal, and use the first power of the radio signal as the detection result.

As the radio signal received by the receiver is so strong that the direct current first current signal included in the separated direct current signal is strong, the percent of the direct current first current signal is large, and the percent of the penetrating current signal is small. As such, the error in the first digital signal may be ignored, and the accuracy of the first power of the radio signal is high.

According to this embodiment, a direct current signal and an alternating current signal are separated from the output signal of the receiver. The direct current signal is converted into a first analog voltage signal, and the first analog voltage signal is buffered. The alternating current signal is converted through a TIA into a radio frequency direct current voltage signal. The radio frequency direct current voltage signal is converted into a second analog voltage signal. A second power of the radio signal is calculated according to the second analog voltage signal, and a determination is made about whether the second power of the radio signal is in a second power range. If yes, the second power of the radio signal is used as a detection result. If no, it is determined that the radio signal is strong, and a percent of the error in the first analog voltage signal is small. A first power of the radio signal is calculated according to the first analog voltage signal, the accuracy of the calculated first power of the radio signal is high, and the first power of the radio signal is used as the detection result. As such, the accuracy of detecting a radio signal power is improved.

Embodiment 6

Figure 6:
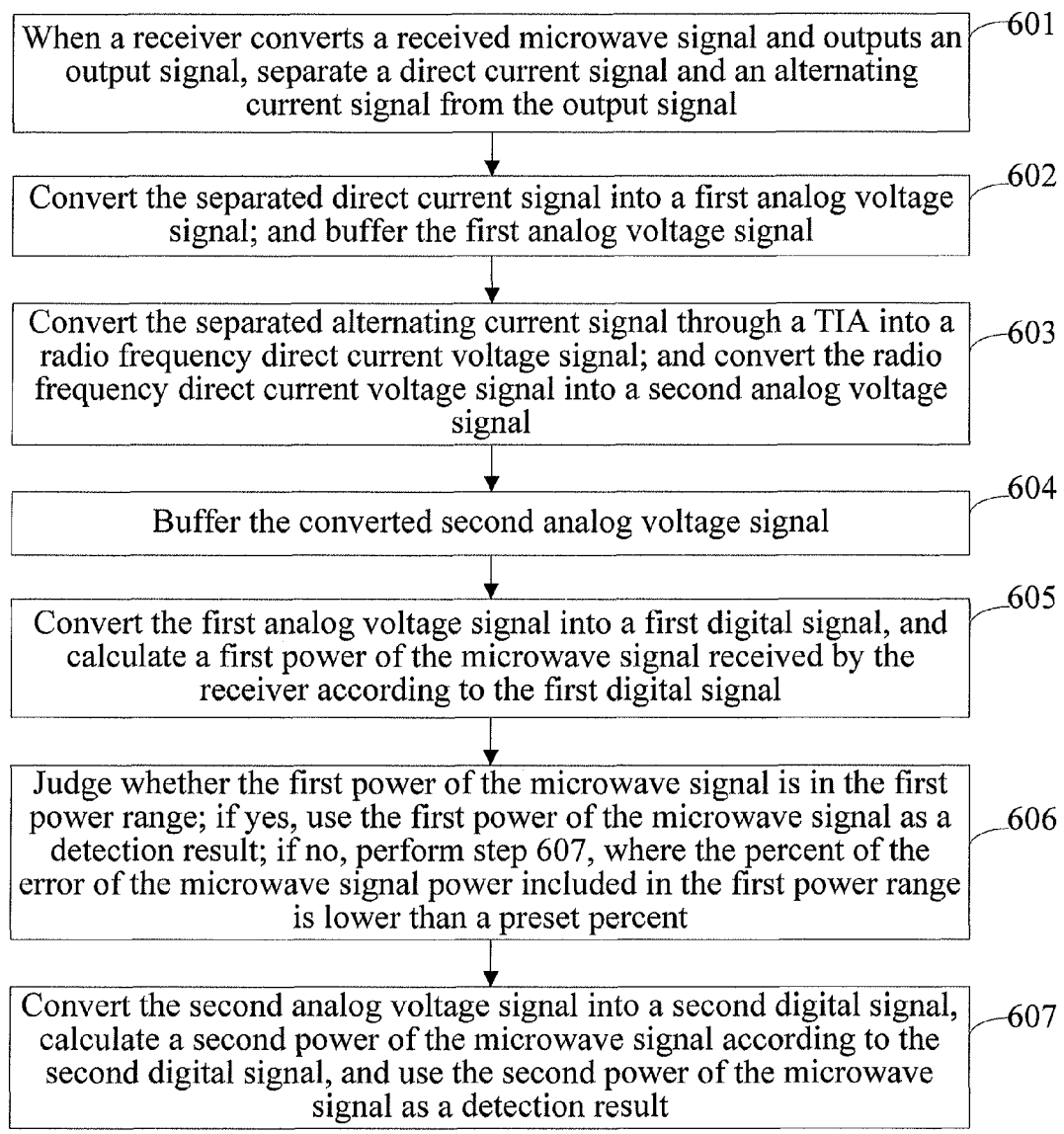
FIG. 6 is a flow chart of a method for detecting a signal power according to Embodiment 6 of the present invention.

This embodiment provides a method for detecting a signal power. The method specifically describes the method provided in Embodiment 1. The receiver receives a microwave signal and outputs an output signal, and then uses the method provided in this embodiment to detect a power of the microwave signal. As shown in FIG. 6, the method includes:

Step 601: When a receiver converts a received microwave signal and outputs an output signal, separate a direct current signal and an alternating current signal from the output signal.

The receiver receives a microwave signal, and converts the received microwave signal into a second current signal. The second current signal includes a direct current second current signal and an alternating current second current signal.

The receiver outputs an output signal after converting the received microwave signal into the second current signal. In addition, as the receiver itself has a penetrating current, and the penetrating current is a direct current. As such, the receiver produces a penetrating current signal, and the penetrating current signal is weak and is a direct current signal. Therefore, the output signal output by the receiver further includes the penetrating current signal in addition to the direct current second current signal and alternating current second current signal.

Therefore, the direct current signal separated from the output signal output by the receiver includes the direct current penetrating current signal and direct current second current signal, and the alternating current signal separated from the output signal output by the receiver includes the alternating current second current signal.

Step 602: Convert the separated direct current signal into a first analog voltage signal; and buffer the first analog voltage signal.

The separated direct current signal includes a penetrating current signal with weak signal strength, so that the converted first analog voltage signal has an error. If the microwave signal received by the receiver is strong, the percent of the penetrating current signal in the separated direct current signal is low, but the percent of the direct current second current signal in the separated direct current signal is large and far larger than the percent of the penetrating current signal. If the microwave signal received by the receiver is weak, the percent of the penetrating current signal in the separated direct current signal is large, so that the percent of the error in the first analog voltage signal is large.

Step 603: Convert the separated alternating current signal through a TIA into a radio frequency direct current voltage signal; and convert the radio frequency direct current voltage signal into a second analog voltage signal.

The TIA has a saturation point. When the microwave signal received by the receiver is weak, the strength of the separated alternating current signal is lower than the saturation point of the TIA. Therefore, no error exists in the obtained radio frequency direct current voltage signal and second analog voltage signal. If the microwave signal received by the receiver is strong, the strength of the separated alternating current signal is higher than the saturation point of the TIA. The strength of the radio frequency direct current voltage signal output by the TIA remains unchanged when the strength of the separated alternating current signal is higher than the saturation point of the TIA. Therefore, an error exists in the obtained radio frequency direct current voltage signal and second analog voltage signal.

Step 604: Buffer the converted second analog voltage signal.

In this embodiment, step 602 may be executed simultaneously with steps 603 and 604. Or steps 603 and 604 may be executed before step 602. This embodiment does not specifically restrict the specific execution sequence.

Step 605: Convert the first analog voltage signal into a first digital signal, and calculate a first power of the microwave signal received by the receiver according to the first digital signal.

If the microwave signal received by the receiver is strong, the percent of the error included in the first analog voltage signal is small. As such, the percent of the error that exists in the first power of the microwave signal calculated according to the first digital signal after the first analog voltage signal is converted into the first digital signal is small, and the accuracy of the calculated first power of the microwave signal is high. If the microwave signal received by the receiver is weak, the percent of the error included in the first analog voltage signal is large. As such, the percent of the error that exists in the first power of the microwave signal calculated according to the first digital signal after the first analog voltage signal is converted into the first digital signal is large, and the accuracy of the first power of the microwave signal is low.

Step 606: Determine whether the first power of the microwave signal is in the first power range. If yes, use the first power of the microwave signal as a detection result; if no, perform step 607. The percent of the error of the microwave signal power included in the first power range is lower than a preset percent.

The percent of the error of the microwave signal power included in the first power range is lower than the preset percent, so that the error that exists in the microwave signal power in the first power range may be accepted. Persons skilled in the art set in advance a preset number of sampling signals, where each sampling signal is a radio signal whose power is known, and then acquire the first power range according to the preset number of sampling signals. For how to acquire the first power range, reference may be made to steps in (1) to (4) in step 206 of Embodiment 2, and it is no longer described herein.

Step 607: Convert the second analog voltage signal into a second digital signal, calculate a second power of the microwave signal according to the second digital signal, and use the second power of the microwave signal as a detection result.

The microwave signal received by the receiver is weak, so that the separated alternating current signal is weak and is lower than the saturation point of the TIA. As such, no error exists in the second analog voltage signal. Therefore, no error exists in the second digital signal obtained through conversion either. The accuracy of the second power of the microwave signal calculated according to the second digital signal is high.

According to this embodiment, a direct current signal and an alternating current signal are separated from the output signal of the receiver. The direct current signal is converted into a first analog voltage signal, and the first analog voltage signal is buffered. The alternating current signal is converted through a TIA into a radio frequency direct current voltage signal. The radio frequency direct current voltage signal is converted into a second analog voltage signal, and the second analog voltage signal is buffered. A first power of the microwave signal is calculated according to the first analog voltage signal, and a determination is made about whether the first power of the microwave signal is in a first power range. If yes, the first power of the microwave signal is used as a detection result. If no, it is determined that the microwave signal is weak, and the strength of the alternating current signal is lower than the saturation point of the TIA. A second power of the microwave signal is calculated according to the second analog voltage signal, the accuracy of the calculated second power of the microwave signal is high, and the second power of the microwave signal is used as the detection result. As such, the accuracy of detecting a power of a microwave signal is improved.

Embodiment 7

Figure 7:
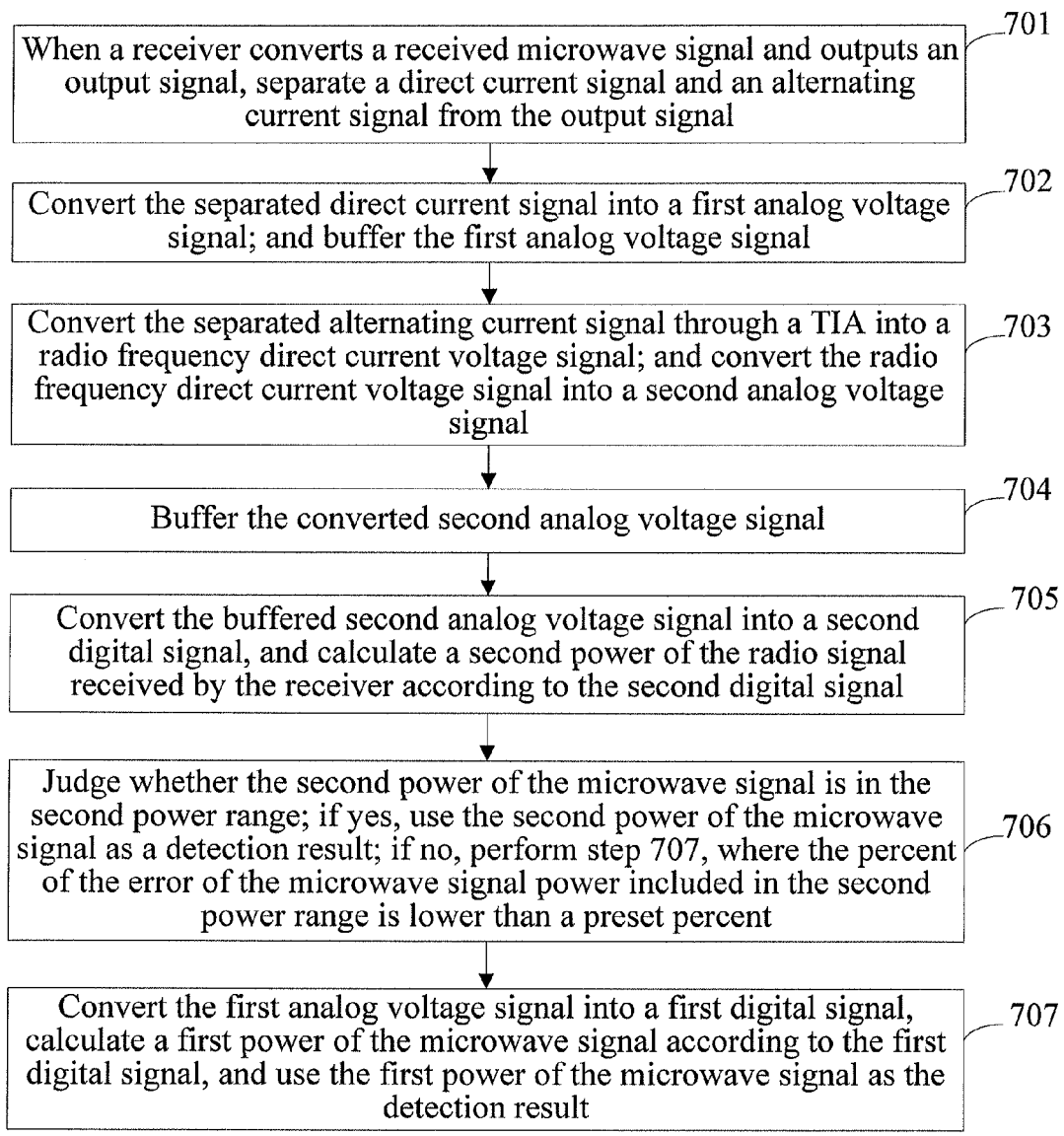
FIG. 7 is a flow chart of a method for detecting a signal power according to Embodiment 7 of the present invention.

This embodiment provides a method for detecting a signal power. The method specifically describes the method provided in Embodiment 1. The receiver receives a microwave signal and outputs an output signal, and then uses the method provided in this embodiment to detect a power of the microwave signal. As shown in FIG. 7, the method includes:

Steps 701-704: They are the same as steps 601-604 in Embodiment 6 respectively, and are no longer described herein.

Step 705: Convert the buffered second analog voltage signal into a second digital signal, and calculate a second power of the microwave signal received by the receiver according to the second digital signal.

If the microwave signal received by the receiver is so strong that the second analog voltage signal has a large error, an error exists in a second power of the microwave signal that is calculated according to a second digital signal after the second analog voltage signal is converted into the second digital signal, and the accuracy of the second power of the microwave signal is low. If the microwave signal received by the receiver is so weak that the second analog voltage signal has no error, no error exists in the second power of the microwave signal that is calculated according to the second digital signal after the second analog voltage signal is converted into the second digital signal, and the accuracy of the second power of the microwave signal is high.

Step 706: Determine whether the second power of the microwave signal is in the second power range. If yes, use the second power of the microwave signal as a detection result; if no, perform step 707. The percent of the error of the microwave signal power included in the second power range is lower than a preset percent.

The percent of the error of the microwave signal power included in the second power range is lower than the preset percent, so that the error that exists in the microwave signal power in the second power range may be accepted. Persons skilled in the art set in advance a preset number of sampling signals, where each sampling signal is a microwave signal whose power is known, and then acquire the second power range according to the preset number of sampling signals. For how to acquire the second power range, reference may be made to steps in (1) to (4) in step 306 of Embodiment 3, and it is no longer described herein.

Step 707: Convert the first analog voltage signal into a first digital signal, calculate a first power of the microwave signal received by the receiver according to the first digital signal, and use the first power of the microwave signal as the detection result.

As the microwave signal received by the receiver is so strong that the direct current photogenerated current signal included in the separated direct current signal is strong, the percent of the direct current photogenerated current signal in the direct current signal is large, and the percent of the penetrating current signal is small, the percents of the errors in the first analog voltage signal and first digital signal may be negligible so that the accuracy of the calculated first power of the microwave signal is high.

According to this embodiment, a direct current signal and an alternating current signal are separated from the output signal of the receiver. The direct current signal is converted into a first analog voltage signal, and the first analog voltage signal is buffered. The alternating current signal is converted through a TIA into a radio frequency direct current voltage signal. The radio frequency direct current voltage signal is converted into a second analog voltage signal, and the second analog voltage signal is buffered. A second power of the microwave signal is calculated according to the second analog voltage signal, and a determination is made about whether the second power of the microwave signal is in a second power range. If yes, the second power of the microwave signal is used as a detection result. If no, it is determined that the microwave signal is strong, and the percent of the error in the first analog voltage signal is small. A first power of the microwave signal is calculated according to the first analog voltage signal, the accuracy of the first power of the microwave signal is high, and the first power of the microwave signal is used as the detection result. As such, the accuracy of detecting a power of a microwave signal is improved.

Embodiment 8

Figure 8:
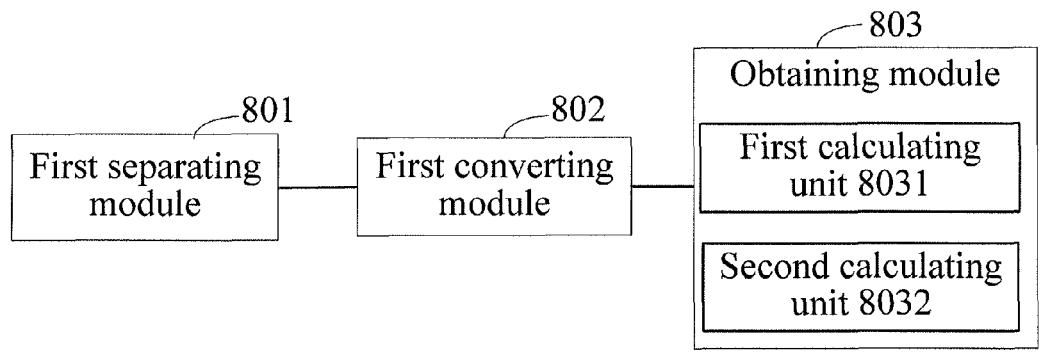
FIG. 8 is a schematic diagram of a first device for detecting a signal power according to Embodiment 8 of the present invention.

As shown in FIG. 8, Embodiment 8 provides a device for detecting a signal power, including:

a first separating module 801, configured to: when a receiver converts a received receive signal and outputs an output signal, separate a direct current signal and an alternating current signal from the output signal;

a first converting module 802, configured to convert the direct current signal into a first analog voltage signal; and convert the alternating current signal into a second analog voltage signal through a TIA; and an obtaining module 803, configured to obtain a power of the receive signal according to the first analog voltage signal and the second analog voltage signal.

The obtaining module 803 includes:

a first calculating unit 8031, configured to calculate a first power of the receive signal according to the first analog voltage signal, and determine whether the first power of the receive signal is in a first power range; if yes, use the first power as a detection result; if no, calculate a second power of the receive signal according to the second analog voltage signal and use the second power as the detection result, where an error percent of a signal power included in the first power range is lower than a preset percent; or, a second calculating unit 8032, configured to calculate a second power of the receive signal according to the second analog voltage signal, and determine whether the second power of the receive signal is in a second power range; if yes, use the second power as a detection result; if no, calculate a first power of the receive signal according to the first analog voltage signal and use the first power as the detection result, where an error percent of a signal power included in the second power range is lower than a preset percent.

The first separating module 801 may be a mirror circuit.

Figure 9:
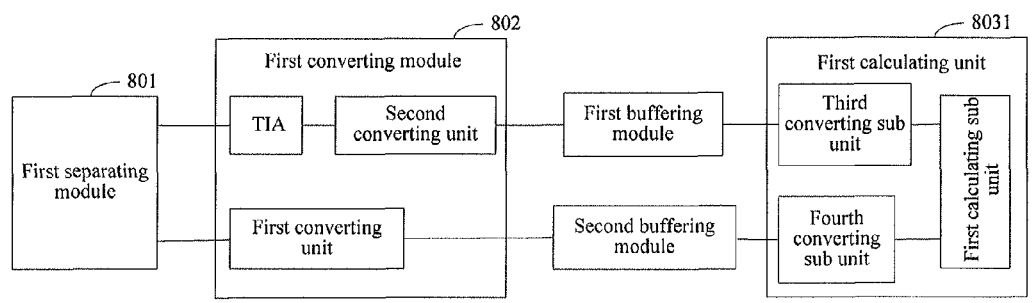
FIG. 9 is a schematic diagram of a second device for detecting a signal power according to Embodiment 8 of the present invention.

Further, as shown in FIG. 9, the first converting module 802 includes:

a first converting unit, configured to convert the separated direct current signal into a first analog voltage signal;

a TIA, configured to convert the separated alternating current signal into a radio frequency direct current voltage signal; and a second converting unit, configured to convert the converted radio frequency direct current voltage signal into a second analog voltage signal.

The first converting unit may be a sampling resistor, and the second converting unit may be a radio frequency logarithmic amplifier.

Further, as shown in FIG. 9, the first calculating unit 8031 includes:

a third converting sub unit, configured to convert the first analog voltage signal into a first digital signal;

a fourth converting sub unit, configured to convert the second analog voltage signal into a second digital signal;

a first calculating sub unit, configured to calculate a first power of the receive signal according to the first digital signal, and determine whether the first power of the receive signal is in a first power range; if yes, use the first power as a detection result; if no, calculate a second power of the receive signal according to the second digital signal and use the second power as the detection result, where an error percent of a signal power included in the first power range is lower than a preset percent.

The third converting sub unit may be an ADC (Analog-to-Digital Converter, analog-to-digital converter), the fourth converting sub unit may be an ADC, and the first calculating sub unit may be an MCU (Micro Control Unit, micro control unit) or a DSP (Digital Signal Processor).

Further, the device further includes:

a first transmitting module, configured to transmit a preset number of sampling signals and make the receiver receive the sampling signals to obtain a receive signal corresponding to the sampling signals, so that the receiver outputs an output signal corresponding to the sampling signals according to the receive signal corresponding to the sampling signals, where the sampling signals are signals whose power is known;

a second separating module, configured to separate a direct current signal from the output signal corresponding to the sampling signals, converting the direct current signal into a digital signal, and calculating a power of the receive signal corresponding to the sampling signals according to the digital signal;

a third calculating module, configured to calculate an error percent corresponding to the sampling signals according to the power of the sampling signals and the power of the receive signal corresponding to the sampling signals and through the following formula (1);

$$\text{Percent} = \left| \frac{P2 - P1}{P1} \right|; \quad (1)$$

where, in the formula (1), Percent indicates the error percent corresponding to the sampling signal, P1 indicates the power of the sampling signal, and P2 indicates the power of the receive signal corresponding to the sampling signal; and a first determining module, configured to select a sampling signal whose receive signal has the smallest power from sampling signals whose error percent is less than or equal to a preset percent, and determine that the first power range is larger than or equal to a power of a receive signal corresponding to the selected sampling signal.

Further, as shown in FIG. 9, the device further includes:

a first buffering module, configured to buffer the second analog voltage signal.

The first buffering module may be a sampling hold circuit.

Further, the device further includes:

a second transmitting module, configured to transmit a preset number of sampling signals and make the receiver receive the sampling signals to obtain a receive signal corresponding to the sampling signals, so that the receiver outputs an output signal corresponding to the sampling signals according to the receive signal corresponding to the sampling signals, where the sampling signals are signals whose power is known;

a third separating module, configured to separate an alternating current signal from the output signal corresponding to the sampling signals, convert the alternating current signal into a radio frequency direct current voltage signal through the TIA, convert the radio frequency direct current voltage signal into a digital signal, and calculate a power of the receive signal corresponding to the sampling signals according to the digital signal;

a fourth calculating module, configured to calculate an error percent corresponding to the sampling signals according to the power of the sampling signals and the power of the receive signal corresponding to the sampling signals and through the following formula (2);

$$\text{Percent} = \left| \frac{P1 - P3}{P1} \right|; \quad (2)$$

where, in the formula (2), Percent indicates the error percent corresponding to the sampling signal, P1 indicates the power of the sampling signal, and P3 indicates the power of the receive signal corresponding to the sampling signal; and a second determining module, configured to select a sampling signal whose receive signal has the largest power from sampling signals whose error percent is less than or equal to a preset percent, and determine that the second power range is less than a power of a receive signal corresponding to the selected sampling signal.

Figure 10:
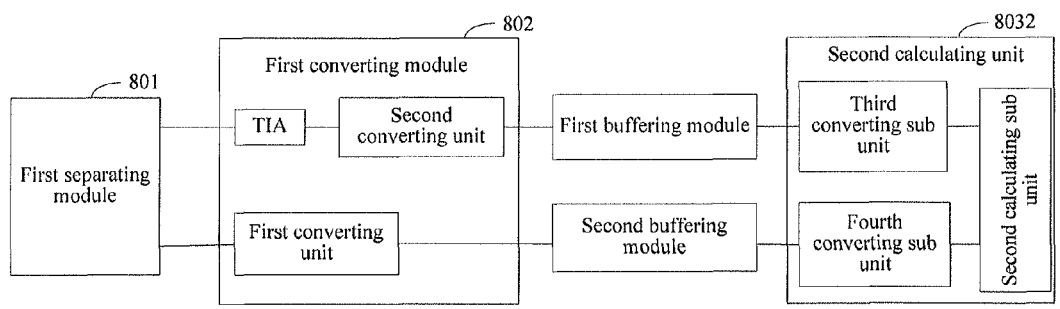
FIG. 10 is a schematic diagram of a third device for detecting a signal power according to Embodiment 8 of the present invention.

Further, as shown in FIG. 10, the second calculating unit 9032 includes:

a third converting sub unit, configured to convert the first analog voltage signal into a first digital signal;

a fourth converting sub unit, configured to convert the second analog voltage signal into a second digital signal;

a second calculating sub unit, configured to calculate a second power of the receive signal according to the second digital signal, and determine whether the second power of the receive signal is in a second power range; if yes, use the second power as a detection result; if no, calculate a first power of the receive signal according to the first digital signal and use the first power as the detection result, where an error percent of a signal power included in the second power range is lower than a preset percent.

The first calculating sub unit may be an MCU or a DSP.

Further, as shown in FIG. 10, the device further includes:

a second buffering module, configured to buffer the first analog voltage signal.

The device for detecting a signal power is mounted in a photoelectric conversion apparatus, and the receive signal is an optical signal.

According to this embodiment, a direct current signal and an alternating current signal are separated from the output signal of the receiver. The direct current signal is converted into a first analog voltage signal. The alternating current signal is converted through a TIA into a second analog voltage signal. A first power of the receive signal is calculated according to the first analog voltage signal, and a determination is made about whether the first power of the receive signal is in a first power range. If yes, the first power is used as a detection result. If no, a second power of the receive signal is calculated according to the second analog voltage signal, and the second power is used as the detection result. The percent of the error of the signal power included in the first power range is lower than a preset percent. Or, the second power of the receive signal is calculated according to the second analog voltage signal, and a determination is made about whether the second power of the receive signal is in a second power range. If yes, the second power is used as the detection result. If no, the first power of the receive signal is calculated according to the first analog voltage signal, and the first power is used as the detection result. The percent of the error of the signal power included in the second power range is lower than the preset percent. As such, the accuracy of the detected power of the receive signal is high.

Persons of ordinary skill in the art should understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for detecting a signal power, wherein the method comprises:

when a receiver converts a received receive signal and outputs an output signal, separating a direct current signal and an alternating current signal from the output signal;

converting the direct current signal into a first analog voltage signal; and converting the alternating current signal into a second analog voltage signal through a transimpedance amplifier TIA; and obtaining a power of the receive signal according to the first analog voltage signal and the second analog voltage signal, wherein, the obtaining a power of the receive signal according to the first analog voltage signal and the second analog voltage signal comprises:

calculating a first power of the receive signal according to the first analog voltage signal, and determining whether the first power of the receive signal is in a first power range; if yes, using the first power as a detection result; if no, calculating a second power of the receive signal according to the second analog voltage signal and using the second power as the detection result, wherein an error percent of a signal power comprised in the first power range is lower than a preset percent; or, calculating a second power of the receive signal according to the second analog voltage signal, and determining whether the second power of the receive signal is in a second power range; if yes, using the second power as a detection result; if no, calculating a first power of the receive signal according to the first analog voltage signal and using the first power as the detection result, wherein an error percent of a signal power comprised in the second power range is lower than a preset percent.

2. The method according to claim 1, before the determining whether the first power of the receive signal is in a first power range, further comprising:

transmitting a preset number of sampling signals and making the receiver receive the sampling signals to obtain a receive signal corresponding to the sampling signals, so that the receiver outputs an output signal corresponding to the sampling signals according to the receive signal corresponding to the sampling signals, wherein the sampling signals are signals whose power is known;

separating a direct current signal from the output signal corresponding to the sampling signals, converting the direct current signal, which is separated from the output signal corresponding to the sampling signals, into a digital signal, and calculating a power of the receive signal corresponding to the sampling signals according to the digital signal;

calculating an error percent corresponding to the sampling signals according to the power of the sampling signals and the power of the receive signal corresponding to the sampling signals and through the following formula (1);

$$\text{Percent} = \left| \frac{P2 - P1}{P1} \right|; \quad (1)$$

wherein, in the formula (1), Percent indicates the error percent corresponding to the sampling signals, P1 indicates the power of the sampling signals, and P2 indicates the power of the receive signal corresponding to the sampling signals; and selecting a sampling signal whose receive signal has the smallest power from sampling signals whose error percent is less than or equal to a preset percent, and determining that the first power range is larger than or equal to a power of a receive signal corresponding to the selected sampling signal.

3. The method according to claim 1, after the converting the alternating current signal into a second analog voltage signal, further comprising:
buffering the second analog voltage signal.

4. The method according to claim 1, before the determining whether the second power of the receive signal is in a second power range, further comprising:
transmitting a preset number of sampling signals and making the receiver receive the sampling signals to obtain a receive signal corresponding to the sampling signals, so that the receiver outputs an output signal corresponding to the sampling signals according to the receive signal corresponding to the sampling signals, wherein the sampling signals are signals whose power is known;
separating an alternating current signal from the output signal corresponding to the sampling signals, converting the alternating current signal, which is separated from the output signal corresponding to the sampling signals, into a radio frequency direct current voltage signal through the TIA, converting the radio frequency direct current voltage signal into a digital signal, and calculating a power of the receive signal corresponding to the sampling signals according to the digital signal;
calculating an error percent corresponding to the sampling signals according to the power of the sampling signals and the power of the receive signal corresponding to the sampling signals and through the following formula (2);

$$\text{Percent} = \left|\frac{P1 - P3}{P1}\right|; \quad (2)$$

wherein, in the formula (2), Percent indicates the error percent corresponding to the sampling signals, P1 indicates the power of the sampling signals, and P3 indicates the power of the receive signal corresponding to the sampling signals; and
selecting a sampling signal whose receive signal has the largest power from sampling signals whose error percent is less than or equal to a preset percent, and determining that the second power range is less than a power of a receive signal corresponding to the selected sampling signal.

5. The method according to claim 1, after the converting the alternating current signal into a first analog voltage signal, further comprising:
buffering the first analog voltage signal.

6. The method according to claim 1, wherein,
the method for detecting a signal power is used in a photoelectric conversion apparatus, and the receive signal is an optical signal.

7. A device for detecting a signal power, wherein the device comprises:
a first separating module, configured to: when a receiver converts a received receive signal and outputs an output signal, separate a direct current signal and an alternating current signal from the output signal;
a first converting module, configured to convert the direct current signal into a first analog voltage signal; and
convert the alternating current signal into a second analog voltage signal through a transimpedance amplifier TIA; and
an obtaining module, configured to obtain a power of the receive signal according to the first analog voltage signal and the second analog voltage signal,
wherein, the obtaining module comprises:
a first calculating unit, configured to calculate a first power of the receive signal according to the first analog voltage signal, and determine whether the first power of the receive signal is in a first power range; if yes, use the first power as a detection result; if no, calculate a second power of the receive signal according to the second analog voltage signal and use the second power as the detection result, wherein an error percent of a signal power comprised in the first power range is lower than a preset percent; or,
a second calculating unit, configured to calculate a second power of the receive signal according to the second analog voltage signal, and determine whether the second power of the receive signal is in a second power range; if yes, use the second power as a detection result; if no, calculate a first power of the receive signal according to the first analog voltage signal and use the first power as the detection result, wherein an error percent of a signal power comprised in the second power range is lower than a preset percent.

8. The device according to claim 7, wherein the first converting module comprises:
a first converting unit, configured to convert the direct current signal into a first analog voltage signal;
a TIA, configured to convert the alternating current signal into a radio frequency direct current voltage signal; and
a second converting unit, configured to convert the radio frequency direct current voltage signal into a second analog voltage signal.

9. The device according to claim 7, wherein the first calculating unit comprises:
a third converting sub unit, configured to convert the first analog voltage signal into a first digital signal;
a fourth converting sub unit, configured to convert the second analog voltage signal into a second digital signal; and
a first calculating sub unit, configured to calculate a first power of the receive signal according to the first digital signal, and determine whether the first power of the receive signal is in a first power range; if yes, use the first power as a detection result; if no, calculate a second power of the receive signal according to the second digital signal and use the second power as the detection result, wherein an error percent of a signal power included in the first power range is lower than a preset percent.

10. The device according to claim 7, wherein the device further comprises:
a first transmitting module, configured to transmit a preset number of sampling signals and make the receiver receive the sampling signals to obtain a receive signal corresponding to the sampling signals, so that the receiver outputs an output signal corresponding to the sampling signals according to the receive signal corresponding to the sampling signals, wherein the sampling signals are signals whose power is known;
a second separating module, configured to separate a direct current signal from the output signal corresponding to the sampling signals, converting the direct current signal, which is separated from the output signal corresponding to the sampling signals, into a digital signal, and calculating a power of the receive signal corresponding to the sampling signals according to the digital signal;

a third calculating module, configured to calculate an error percent corresponding to the sampling signals according to the power of the sampling signals and the power of the receive signal corresponding to the sampling signals and through the following formula (1);

$$\text{Percent} = \left|\frac{P2 - P1}{P1}\right|; \quad (1)$$

wherein, in the formula (1), Percent indicates the error percent corresponding to the sampling signals, P1 indicates the power of the sampling signals, and P2 indicates the power of the receive signal corresponding to the sampling signals; and a first determining module, configured to select a sampling signal whose receive signal has the smallest power from sampling signals whose error percent is less than or equal to a preset percent, and determine that the first power range is larger than or equal to a power of a receive signal corresponding to the selected sampling signal.

11. The device according to claim 7, wherein the device further comprises:

a first buffering module, configured to buffer the second analog voltage signal.

12. The device according to claim 7, wherein the second calculating unit comprises:

a third converting sub unit, configured to convert the first analog voltage signal into a first digital signal;

a fourth converting sub unit, configured to convert the second analog voltage signal into a second digital signal;

a second calculating sub unit, configured to calculate a second power of the receive signal according to the second digital signal, and determine whether the second power of the receive signal is in a second power range; if yes, use the second power as a detection result; if no, calculate a first power of the receive signal according to the first digital signal and use the first power as the detection result, wherein an error percent of a signal power included in the second power range is lower than a preset percent.

13. The device according to claim 7, wherein the device further comprises:

a second transmitting module, configured to transmit a preset number of sampling signals and make the receiver receive the sampling signals to obtain a receive signal corresponding to the sampling signals, so that the receiver outputs an output signal corresponding to the sampling signals according to the receive signal corresponding to the sampling signals, wherein the sampling signals are signals whose power is known;

a third separating module, configured to separate an alternating current signal from the output signal corresponding to the sampling signals, convert the alternating current signal, which is separated from the output signal corresponding to the sampling signals, into a radio frequency direct current voltage signal through the TIA, convert the radio frequency direct current voltage signal into a digital signal, and calculate a power of the receive signal corresponding to the sampling signals according to the digital signal;

a fourth calculating module, configured to calculate an error percent corresponding to the sampling signals according to the power of the sampling signals and the power of the receive signal corresponding to the sampling signals and through the following formula (2);

$$\text{Percent} = \left|\frac{P1 - P3}{P1}\right|; \quad (2)$$

wherein, in the formula (2), Percent indicates the error percent corresponding to the sampling signals, P1 indicates the power of the sampling signals, and P3 indicates the power of the receive signal corresponding to the sampling signals; and a second determining module, configured to select a sampling signal whose receive signal has the largest power from sampling signals whose error percent is less than or equal to a preset percent, and determine that the second power range is less than a power of a receive signal corresponding to the selected sampling signal.

14. The device according to claim 7, wherein the device further comprises:

a second buffering module, configured to buffer the first analog voltage signal.

15. The device of claim 7, wherein, the device for detecting a signal power is used in a photoelectric conversion apparatus, and the receive signal is an optical signal.

* * * * *